United States Patent [19]

Baliozian

[11] Patent Number: 4,649,463
[45] Date of Patent: Mar. 10, 1987

[54] LIGHTING APPLIANCE HAVING HIGH DIFFUSION POWER

[76] Inventor: Mardick Baliozian, 10 E. Ontario St., Chicago, Ill. 60611

[21] Appl. No.: 722,717

[22] Filed: Apr. 11, 1985

[30] Foreign Application Priority Data

Apr. 16, 1984 [CH] Switzerland ............ 1898/84

[51] Int. Cl.$^4$ ............................................. G03B 15/06
[52] U.S. Cl. .................................... 362/17; 362/297; 362/307
[58] Field of Search ............ 362/17, 297, 307, 343, 362/346

[56] References Cited

U.S. PATENT DOCUMENTS

| | | | |
|---|---|---|---|
| 1,596,159 | 8/1926 | Doane | 362/343 |
| 4,053,766 | 10/1977 | Brass | 362/297 |
| 4,409,646 | 10/1983 | Baliozian | 362/17 |
| 4,428,030 | 1/1984 | Baliozian | 362/297 |

FOREIGN PATENT DOCUMENTS

| | | | |
|---|---|---|---|
| 7245 | of 1914 | United Kingdom | 362/307 |
| 310547 | 4/1930 | United Kingdom | 362/297 |

Primary Examiner—Andrew M. Dolinar
Attorney, Agent, or Firm—August E. Roehrig, Jr.

[57] ABSTRACT

A lighting appliance having high diffusion power, in particular for illuminating a subject when taking photographs, shooting films or the like. The appliance comprises a diffusion screen placed in front of a light source carried by the base of the lighting unit and a reflector placed behind the light source. The diffusion screen has at least two flat or curved faces directed both towards the front and towards the sides. The space delimited above the base of the lighting unit is closed at the rear by a reflecting wall and the top face of the base is also reflecting. A curved or faceted lateral cheek is provided opposite to the faces of the diffusion screen and on each side. The cheek face which is directed towards the diffusion screen is reflecting and the internal edges of the cheek are rigidly fixed both to the corresponding edge of the base of the lighting unit and to the respective rear edge of the diffusion screen.

8 Claims, 7 Drawing Figures

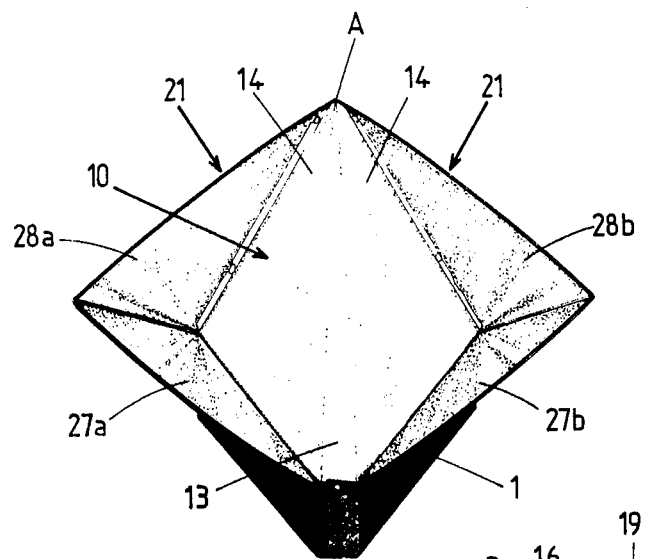
FIG_1
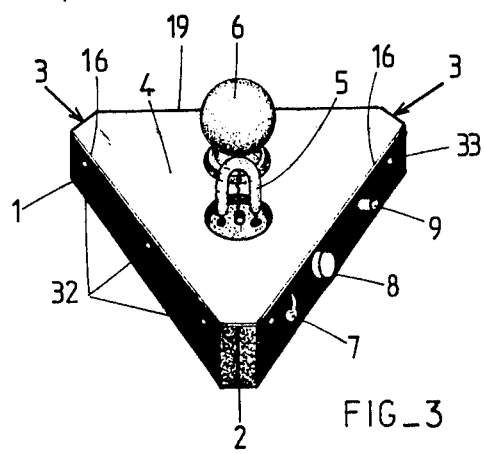
FIG_3
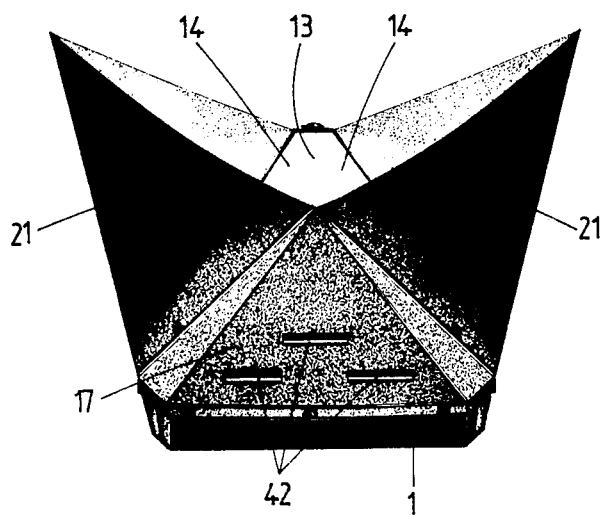
FIG_2

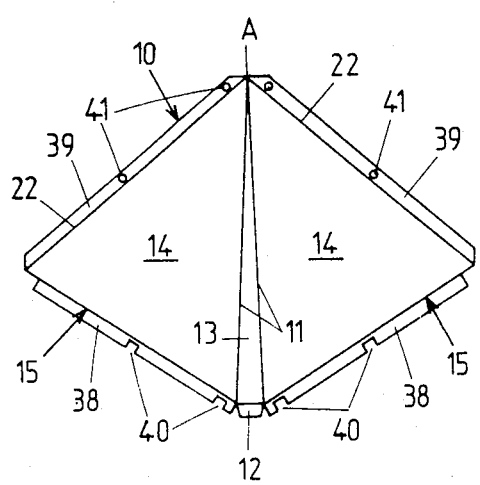
FIG_4
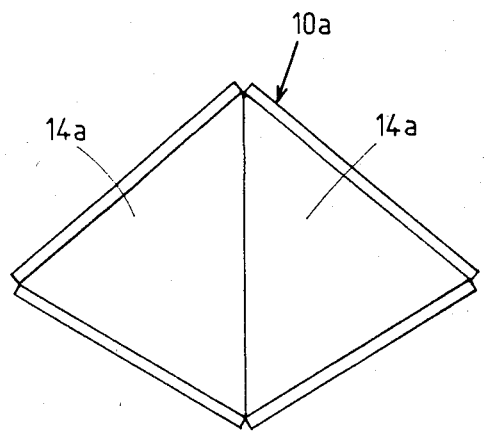
FIG_4A
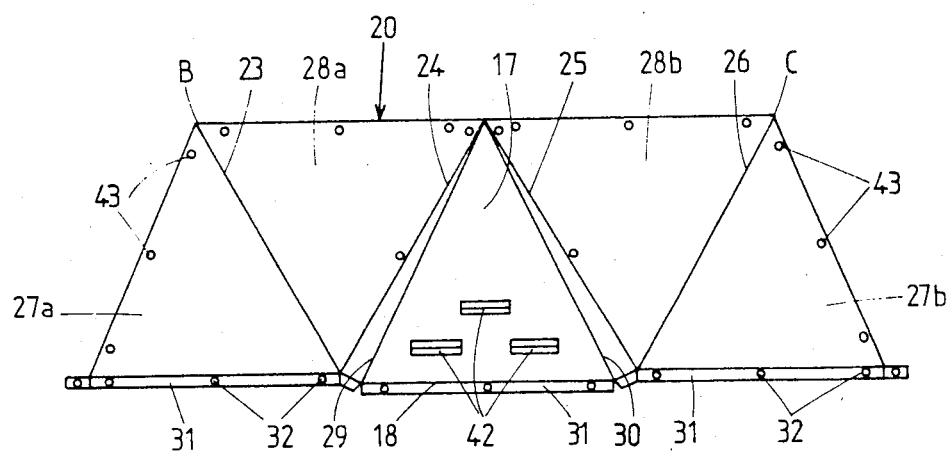
FIG_5
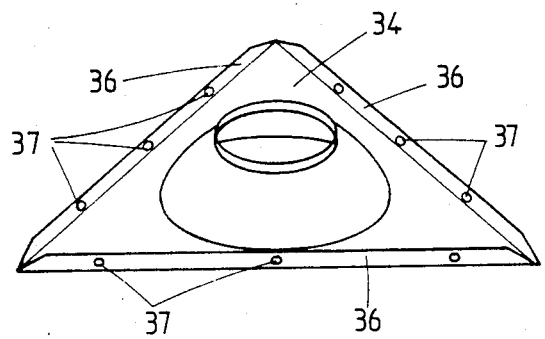
FIG_6

LIGHTING APPLIANCE HAVING HIGH DIFFUSION POWER

BACKGROUND OF THE INVENTION

1. Field of the Invention

This invention relates to lighting appliances which are intended to be employed in particular for taking photographs, shooting films or the like.

2. Description of the Prior Art

For applications of this type, the light sources usually employed (such as small flash tubes, halogen lamps, metal vapor lamps or gas-discharge lamps) are subject to disadvantages if they are used as they stand for lighting a subject. The lighting thus obtained is in fact too harsh and not only casts shadows which are too sharp but also produces reflections which are too bright. In order to obtain soft and more satisfactory lighting, it would prove necessary to increase the dimensions of the light source to a considerable extent. This would indeed have the effect of producing shadows which are more diffuse and less sharply contrasted. Furthermore, the subject would be illuminated under better conditions since he or she would not be hindered by dazzling light. However, in order to achieve a really adequate result, the increase in dimensions of the light source would in that case have to be considerable.

In order to solve this problem, different known types of lighting appliances have already been proposed for the use of a small-size light source for the production of diffused lighting of larger size and oriented towards the subject to be illuminated. With this objective, appliances of this type are provided with diffusion screens on their outer face.

It has thus been proposed to provide lighting appliances with curved reflectors made of aluminum or molded plastic. However, these appliances are particularly costly and the results obtained are not entirely satisfactory.

A folding reflector has also been proposed in the form of an umbrella with a light source placed at the center. Devices of this type do have the advantage of low cost but are still attended by a certain number of disadvantages from a practical standpoint. From a photographic point of view, they also have the disadvantage of producing certain troublesome reflections (circular reflection with a dark spot at the center corresponding to the location of the light source and lines corresponding to the stiffening members of the umbrella frame).

For the application under consideration, another existing type of lighting appliance consists of a rigid box having the shape of a pyramid or the like and having internal reflecting walls placed around a light source with a diffusion screen placed in front. Current devices of this type, however, are relatively heavy and costly to produce. Furthermore, the lighting provided by these devices falls short of the required standard.

SUMMARY OF THE INVENTION

For the reasons given in the foregoing, the object of the present invention is to provide a lighting appliance which is designed for the application under consideration while ensuring excellent lighting of the subject to be illuminated with satisfactory diffusion of light on the subject, but without any unnecessary dispersion of light outside the area to be illuminated. Furthermore, the design concept of this appliance is such that it is particularly inexpensive to produce and can also be readily moved with respect to the subject to be illuminated.

To this end, the appliance under consideration, which comprises a diffusion screen placed in front of a light source carried by the base of said appliance, is distinguished by the fact that said diffusion screen has at least two flat or curved faces directed both towards the front and towards the sides and the space delimited above the base of the lighting unit is closed at the rear by a reflecting wall, the top face of the base being also reflecting. Provision is made opposite to the faces of said diffusion screen and on each side for a curved or faceted lateral cheek. The cheek face which is directed towards the diffusion screen is reflecting and the internal edges of said cheek are secured both to the corresponding edge of the base of the lighting unit and to the respective rear edge of the diffusion screen.

By virtue of the arrangement thus provided, the light emitted by the light source carried by the base is suitably diffused within the space and directed towards the subject to be illuminated in such a manner as to ensure relatively soft lighting of the subject without any sharp contrast.

In a particularly advantageous embodiment of the appliance under consideration, the reflecting rear wall and the two lateral cheeks which are also reflecting are constituted by a single-piece panel having hinge lines at the boundaries between these different portions as well as between the different facets of the reflecting lateral cheeks, the diffusion screen itself being constituted by a single sheet of translucent material having a folding line at the boundary between the two different faces of said screen.

In accordance with another distinctive feature of this embodiment, the panel constituting the reflecting rear wall and the reflecting lateral cheeks as well as the sheet of translucent material constituting the diffusion screen are provided on their coupling or fastening edges with marginal strips each delimited by a hinge line and provided with holes in which are engaged joining or fastening elements for the purpose on the one hand of fastening on the base of the lighting unit and on the other hand of securing said elements to each other.

This particular embodiment has the advantage of being extremely inexpensive to produce since, apart from the base which carries the corresponding light source as well as the ancillary elements, the box is formed simply by two different parts, each part being constituted very simply by a plate or a sheet having a predetermined number of folding or hinge lines.

BRIEF DESCRIPTION OF THE DRAWINGS

Other features of the invention will be more apparent to those versed in the art upon consideration of the following description and accompanying drawings, wherein:

FIG. 1 is a perspective view of the front face of the present appliance;

FIG. 2 is a perspective view of the appliance corresponding to an oblique rear view;

FIG. 3 is a perspective view of the base;

FIG. 4 is an overhead plan view of the sheet of translucent material which constitutes the diffusion screen, said sheet being accordingly placed in a flat position;

FIG. 4a is a similar view of an alternative embodiment of said diffusion screen;

FIG. 5 is an overhead plan view of the reflecting plate of plastic material which corresponds to the second box component of the appliance (apart from the base of the appliance); and FIG. 6 is a perspective view of a reflector which is intended to be employed with another independent light source and can serve in this case as a base for the reflection and diffusion box of the appliance in accordance with the invention.

DESCRIPTION OF THE PREFERRED EMBODIMENTS

In the example illustrated in the drawings, the appliance in accordance with the invention comprises a base 1 having a contour which assumes substantially the shape of an equilateral triangle with truncated corners. At the locations corresponding to the corners, the periphery of said base is in fact provided with three small flat faces 2 and 3. One of these latter (namely the face 2 shown by way of example in FIG. 3) is intended to be placed at the front of the appliance whereas the other two faces are placed at the rear. This base constitutes a box which is made of metal or any other suitable material and within which are placed all the electrical and electronic components required for supplying the light sources provided as well as for the practical utilization of the appliance.

The light source or sources provided are placed above the top surface of the base, said top surface being constituted by a plate 4 of reflecting material or of material provided with a reflecting coating. In the example shown in FIG. 3, the light sources provided consist of a flash tube 5 and an incandescent lamp 6 which is simply intended to enable the user to control the lighting effect produced. However, instead of a flash tube and a control lamp, provision could be made for one or a number of continuous-lighting lamps such as incandescent lamps or gas-discharge lamps, and so on. The base 1 is equipped with the various control elements required for the use of the appliance under consideration, and in particular a general switch 7, a control knob 8 for regulating light intensity and a connector 9 for synchronization coupling with another device such as another lighting appliance, for example.

The diffusion screen provided on this appliance is constituted by a sheet 10 of translucent material which assumes the general shape of a lozenge. This sheet has two folding lines 11 which extend from one of its vertices, namely its vertex A as shown in the figures. These two lines extend towards a small side 12 which is provided instead of the opposite vertex and has the same width as the small front face 2 of the base 1.

These two folding lines 11 thus delimit between them a small thin-wedge triangle 13. However, said two folding lines also delimit on each side of said small triangle 13 two large triangles 14 which correspond to the two large faces of the diffusion screen.

In fact, the sheet 10 is intended to be fixed above the base 1 in the position shown in FIG. 1, that is to say by fixing its bottom edges 15 along the lateral sides 16 of the base 1. Said screen thus forms a dihedron which is open at the rear and the front edge of which is replaced by the small thin-wedge triangular face 13.

The space delimited by said screen is closed at the rear by a reflecting wall 17 of triangular shape, the base 18 of which is fixed along the rear edge 19 of the base 1. However, as described hereinafter, said reflecting wall 17 forms part of a plate 20 of plastic material which constitutes in addition two reflecting cheeks 21 placed on each side of the two faces 14 of the diffusion screen 10. Each of these lateral cheeks has two distinct faces designated respectively by the references 27a and 28a on one side and by the references 27b and 28b on the other side. The two faces of each cheek 21 form a dihedron which is open both towards the front and towards the diffusion-screen face 14 opposite to which said dihedron is located. The edge of each dihedron extends between the corresponding rear corner of the base 1 and a point B or C located on the front side of the appliance. In regard to the two rear edges of these two reflecting cheeks 21, they are secured respectively to the corresponding lateral edge 16 of the top face of the base 1 and to the respective rear edge 22 of the diffusion screen 10.

However, as already mentioned earlier, the two triangular faces of these two reflecting cheeks 21 and the reflecting rear wall 17 which also has a triangular contour are advantageously constituted by a single-piece plate 20 of relatively thin plastic. Said plate has zigzag hinge lines 23, 24, 25 and 26 which delimit on each side of the triangular rear wall 17 the four other triangular faces which are necessary in order to constitute the two reflecting lateral cheeks 21, namely two triangular surfaces 27a and 28a on one side and two triangular surfaces 27b and 28b on the other side. However, the rear wall 17 is not delimited by the two hinge lines 24 and 25 but by two other adjacent hinge lines 29 and 30 respectively which form in each case a thin-wedge triangle of small surface area with the hinge line 24 or 25. These two triangles are intended to be located respectively opposite to the small rear faces 3 of the base 1 of the appliance. The base of said two triangles in any case corresponds to the width of these small facets.

The plate 20 thus provided is of a plastic material such that the different hinge lines can be provided in this latter simply by compression lines or grooves formed at the time of cutting-out of said plate. To this end, the plastic material employed should be capable of folding without any risk of damage at the locations of said hinge lines. That face of said plate which is intended to be directed towards the front is provided with a reflecting metal coating which preferably has a grained surface. So far as the opposite face is concerned, it can be painted black or in any other desired color.

On that edge which corresponds to the base of the reflecting rear wall 17 and to the base of the two reflecting lateral cheeks 21, the plate 20 is provided with additional hinge lines which delimit marginal strips 31 for attaching said plate to the corresponding edges of the base 1. To this end, said marginal strips are provided with a series of holes 32 which are intended to be engaged on projecting studs or buttons 33 provided on the corresponding sides of the base 1. However, said studs also serve to attach the diffusion screen 10 and possibly also the reflecting plate placed on the top surface 4 of the base 1. In fact, this face itself could quite easily be non-reflecting but adapted to receive an added reflector.

The diffusion screen 10 is in turn provided with folding lines which extend in a direction parallel to its edges and delimit marginal strips 38 and 39 respectively. The marginal strips 38 formed at the base of the two large faces 14 of the diffusion screen and at the base of the small thin-wedge triangle 13 located at the center are provided with holes or notches 40 for receiving the projecting studs 33 of the base 1.

So far as the marginal strips 39 of the opposite edges are concerned, these strips are provided with holes 41 for receiving coupling elements in order to secure them to the rear edges of the reflecting lateral cheeks 21, additional complementary holes 42 being provided at this location in the plate 20. The coupling elements employed can be rivets such as, for example, simple elastic rivets of plastic material, press-studs, elements of adhesive fabric, and so on.

The assembly of these various elements on the base 1 is carried out first of all by fitting the top edges of the diffusion screen 10 on the corresponding sides of the panel 20. The bottom edges of the diffusion screen 10 are then fitted on the corresponding lateral sides of the base, thus giving said screen the shape of a dihedron. Finally, the bottom edges of the plate 20 are fitted in position on the three sides of the base 1, thus giving said plate its final shape in which it constitutes both the reflecting rear wall 17 and the two faces of each of the two reflecting lateral cheeks 21. During the last operation just mentioned, the rear edges of the two large faces 14 of the diffusion screen are secured to the edges of the reflecting rear wall 17. Under these conditions, the bottom edges 38 of said diffusion screen are imprisoned between the edges of the base 1 and the edges 31 of the two reflecting lateral cheeks 21. It is for this reason that the edges 38 of said screen can be provided with simple notches 40 instead of holes.

It should be observed that the plate 20 is provided with louvers 42 on the portion which constitutes the rear wall 17. Said louvers are intended to permit removal of the heat dissipated by the two light sources 5 and 6. In addition, a series of holes 43 are provided at a short distance from the edges of the triangular faces 27a, 28a, 27b and 28b of the two reflecting lateral cheeks 21. Said holes are intended to permit positioning of a colored screen, a filter, a spotlight grid or any other similar accessory on the front of each of these reflecting lateral cheeks.

Furthermore, the base 1 can advantageously be provided with a support which makes it possible to employ the base in different ways and not simply by placing it on a bearing surface. This support can consist of a metal bracket, the arms of which are pivotally attached to the sides of the base 1. This makes it possible to fix the support bracket on a stand or tripod of the type employed for photographic cameras.

The design concept of the appliance in accordance with the invention is such that the light emitted by the light source provided within the interior of the appliance propagates in a number of different ways towards the subject to be illuminated. Part of this light passes directly through the two large faces 14 of the diffusion screen as well as the small thin-wedge triangular face 13 provided at the center of this latter. A fraction of this light then reaches the subject to be illuminated whilst the other fraction strikes the reflecting internal faces of the two lateral cheeks 21 and is then reflected either towards the subject to be illuminated or back again to the appliance in order to undergo further reflections. The light emitted in the rearward direction is reflected towards the front by the reflecting rear wall 17 and the corresponding light rays accordingly have the same destination as those which are emitted directly towards the front and towards the sides. So far as the light rays emitted in the downward direction are concerned, these rays are reflected upwards from the reflector 34 and can accordingly have the same destination as the other light rays.

Under these conditions, a large proportion of the emitted light rays undergoes a succession of different reflections before being diffused outwards in the direction of the subject to be illuminated. These different successive reflections are comparable with those which take place in a kaleidoscope. The effect thereby achieved is to mix the light rays a number of times and thus to produce a very homogeneous light. Illumination of the subject is achieved under excellent conditions, that is to say with soft light without any sharp contrast. Moreover, the fact that the light rays are mixed by successive reflections avoids the presence of hot spots. When making use of a normal light source of small size, the appliance in accordance with the invention makes it possible to obtain a level of illumination similar to the level which would be produced by a light source of very large size and is thus capable of lighting a predetermined subject under excellent conditions.

This advantageous result is due to the combination of the distinctive shape of the box of the present appliance and the two reflecting lateral cheeks. A point worthy of note in this connection is that the box proper as constituted by the top face of the base 1, the two large faces 14 of the diffusion screen and the reflecting rear wall 17 has the general shape of a tetrahedron whereas the two reflecting lateral cheeks each have the shape of a dihedron which is open on one side, namely the side directed towards the corresponding face 14 of the diffusion screen.

However, the shape of the different portions of the appliance can vary, on condition that the diffusion screen always has lateral faces directed both towards the front and towards the sides and that the reflecting lateral cheeks form virtual conches which open towards the lateral faces of said screen. Thus FIG. 4A illustrates an alternative embodiment of the diffusion screen in which the corresponding translucent sheet 10a no longer comprises a thin-wedge triangle 13 at the center. In fact, this sheet simply comprises two large triangular faces 14a. Under these conditions, the diffusion screen formed by said sheet assumes the exact shape of a dihedron. In consequence, the different corners of the base 1 are not truncated in this alternative embodiment as was the case in the preceding embodiment. Similarly, the plastic plate constituting the reflecting surfaces is therefore not provided with the small thin-wedge triangles as was the case with the plate 20 shown in FIG. 5.

Conversely, instead of having a single large face 14 or 14a on each side, the diffusion screen 10 could have two distinct faces inclined at different angles. Furthermore, the faces of said screen could be curved instead of being perfectly flat as was the case in the embodiment described earlier.

In regard to the reflecting lateral cheeks 21, these cheeks could have more than two distinct faces. These faces could have a curved shape instead of being perfectly flat. It may be added that, instead of having the shape of a dihedron or the like, these reflecting cheeks could have the shape of curved conches or the like.

The construction of the box of the present appliance from only two elements in addition to the base 1, namely from a plate 20 of plastic material and from a translucent sheet 10, is particularly advantageous in regard to reduction in cost price of the lighting unit. However, the appliance in accordance with the invention is not limited in any sense to this single embodiment. In fact, the different parts of the box could be constituted by separate and distinct elements which are assembled together along their lines of junction. They could also be manufactured in a number of different ways.

Furthermore, the base 1 could be formed differently. Thus FIG. 6 illustrates a reflector 34 which can receive the constituent elements of the reflection and diffusion box of the appliance in accordance with the invention. Said reflector is so designed as to permit adaptation of the lighting unit to an existing light source. To this end, said reflector is constituted by a plate provided with a central hole through which the source can be passed. Said hole can be surrounded by a reflecting bowl of parabolic shape or the like. The plate forming said reflector has turned-up flanges 36 provided with fastening elements 37 for fitting above said reflector the diffusion screen 10 as well as the plate 20 which forms the different reflecting faces of the box.

By virtue of its design concept, the appliance in accordance with the invention offers in particular the following advantages:

(1) In the first place, the device achieves a considerable increase in the level of illumination produced by a light source of small size, the light intensity thus provided being very uniform.

This is due to the distinctive process of light propagation and to the different reflections described earlier as well as to the diffusion of light through the screen 10.

This appliance ensures perfect diffusion of light towards the subject to be illuminated without any unnecessary dispersion of light on each side as is the case with many appliances at present in use for similar applications.

(2) The reflections of the light source on the illuminated subject do not have any dark spots and the shadows cast are diffuse and homogeneous, thus removing two particularly objectionable disadvantages of some types of appliances in current use.

(3) In spite of its relatively large volume, the appliance in accordance with the invention is of low weight. This greatly facilitates handling and permits easy transportation to service locations or in other words to photographic snapshot locations, motion-picture shooting locations or the like.

(4) This appliance is of very rigid and rugged design although it is constructed from flexible or semiflexible elements.

(5) The appliance has a highly attractive external appearance.

(6) It is possible to equip said appliance with light sources of different types. In all cases, the lighting produced by the appliance achieves excellent results for photographic snapshots, motion pictures or the like without entailing any need to provide optical reflectors of spherical shape, elliptical shape or the like, the cost price of which would be high.

(7) However, although the appliance in accordance with the invention is particularly well suited for lighting of a subject while taking photographs, shooting films or the like, it can also be used for many other applications.

What is claimed is:

1. A lighting appliance having high diffusion power which is intended to be employed in particular for taking photographs, shooting films or the like, and comprising a triangular shaped lighting appliance base having a light source carried thereon and further including a diffusion screen carried upon said base in a position in front and to the sides of said light source, said diffusion screen having at least two triangular faces each one of said faces being directed both toward the front and towards the sides of the lighting appliance, the space delimited above said lighting appliance base being closed at the rear by a reflecting wall, said base having a top face forming a relfective surface, lateral cheeks each having a cheek face which is directed towards the diffusion screen forming a relfective surface and being positioned opposite to a face of said diffusion screen on each side thereof, said cheeks each having internal edges for securing said cheeks to the corresponding edge of the lighting appliance base and to a portion of said diffusion screen.

2. The lighting apparatus of claim 1 wherein said triangular shaped lighting appliance base has truncated corners.

3. The lighting apparatus of claim 1 wherein said triangular shaped lighting appliance base is shaped substantially as an equilateral triangle.

4. A lighting appliance having high diffusion power which is intended to be employed in particular for taking photographs, shooting films or the like, and comprising a lighting appliance base having a light source carried thereon and further including a diffusion screen carried upon said base in a position in front and to the sides of said light source, said diffusion screen having at least two faces each one of said faces being directed both towards the front and toward the sides of the lighting appliance, the space delimited above said lighting appliance base being closed at the rear by a reflecting wall, said base having a top face forming a reflective surface, lateral cheeks each having a cheek face which is directed toward the diffusion screen forming a reflective surface and being positioned opposite to a face of said diffusion screen on each side thereof, said cheeks each having internal edges for securing said cheeks to the corresponding edge of the lighting appliance base and to a portion of said diffusion screen, said relfecting rear wall and said two lateral reflective cheek faces are constituted as portions of a single-piece panel having hinge lines forming the boundaries between these said portions as well as forming at least two facets in the reflecting lateral cheeks, said diffusion screen being consituted by a single sheet of translucent material having folding lines formed therein to define two different faces of said screen.

5. A lighting appliance according to claim 4, wherein said panel constituting said reflecting rear wall and said reflecting lateral cheeks, as well as the sheet of translucent material consitituting the diffusion screen are provided with marginal strips forming fastening edges, each of said fastening edges being delimited by a hinge line and provided with holes for receiving fastening elements for the purpose of mutually exclusively fastening onto said lighting appliance base and securing said elements one to the other.

6. A lighting appliance having high diffusion power which is intended to be employed in particular for taking photographs, shooting films or the like, and comprising a lighting appliance base having a light source carried thereon and further including a diffusion screen carried upon said base in a position in front and to the sides of said light source, said diffusion screen having at least two faces each one of said faces being directed both towards the front and towards the sides of the lighting appliance, said diffusion screen comprises two faces of a tetrahedron in which two other faces are consitituted by said reflecting rear wall and said top face of said lighting appliance base, an edge which separators the two faces of said diffusion screen being positioned at the front of the lighting appliance base, the space delimited above said lighting appliance base being closed at the rear by a reflecting wall, said base having a top face forming a reflective surface, lateral cheeks each having a cheek face which is directed towards the diffusion screen forming a relfective surface and being positioned opposite to a face of said diffusion screen on each side thereof, said cheeks each having internal edges for securing said cheeks to the corresponding edge of the lighting appliance base and to a portion of said diffusion screen.

7. A lighting appliance having high diffusion power which is intended to be employed in particular for taking photographs, shooting films or the like, and comprising a lighting appliance base having a light source carried thereon and further including a diffusion screen carried upon said base in a position in front and to the sides of said light source, said diffusion screen having at least two faces each one of said faces being directed both toward the front and towards the sides of the lighting appliance, said diffusion screen comprising two faces of a tetrahedron in which two other faces are consitituted by said reflecting rear wall and said top face of said lighting appliance base, said diffusion screen including a triangular facet whose base is rigidly fixed to the front of said lighting appliance base whilst its vertex coincides with the vertices of the two large faces of said diffusion screen, the space delimited above said lighting appliance base being closed at the rear by a reflecting wall, said base having a top face forming a reflective surface, lateral cheeks each having a cheek face which is directed towards the diffusion screen forming a reflective surface and being positioned opposite to a face of said diffusion screen on each side thereof, said cheeks each having internal edges for securing said cheeks to the corresponding edge of the lighting appliance base and to a portion of said diffusion screen.

8. A lighting appliance according to claim 7, wherein each reflecting lateral cheek has the shape of a dihedron in which two faces assume the shape of two triangles joined together along one side whilst the edge of the other side is rigidly fixed mutually exclusively either to the adjacent side of the top face of the lighting appliance base or to the respective rear side of said diffusion screen, the third side being directed outwards.

* * * * *